United States Patent [19]

Pusch et al.

[11] Patent Number: 4,941,748
[45] Date of Patent: Jul. 17, 1990

[54] EXTRUDER WITH CERAMIC PROCESSING UNIT

[75] Inventors: Werner Pusch; Martin Ullrich, both of Leverkusen, Fed. Rep. of Germany

[73] Assignee: Bayer Aktiengesellschaft, Leverkusen, Fed. Rep. of Germany

[21] Appl. No.: 320,025

[22] Filed: Mar. 7, 1989

[30] Foreign Application Priority Data

Mar. 25, 1988 [DE] Fed. Rep. of Germany ....... 3810079

[51] Int. Cl.⁵ ...................... B29C 47/40; B29C 47/60; B29C 47/66
[52] U.S. Cl. ...................................... 366/85; 425/190; 425/192 R; 425/200; 425/208
[58] Field of Search ................... 425/190, 192 R, 182, 425/200, 204, 205, 207–209, 186; 366/79, 83–85; 264/349

[56] References Cited

U.S. PATENT DOCUMENTS

| | | | |
|---|---|---|---|
| 3,900,188 | 8/1975 | Seufert | 366/79 |
| 4,036,540 | 7/1977 | Seufert | 425/192 R |
| 4,474,473 | 10/1984 | Higuchi et al. | 425/208 |
| 4,530,761 | 7/1985 | Koch et al. | 210/407 |
| 4,599,002 | 7/1986 | Gutknecht | 425/204 |
| 4,640,672 | 2/1987 | Ellwood | 425/192 R |
| 4,696,575 | 9/1987 | Upmeier | 425/190 |
| 4,746,220 | 5/1988 | Sukai et al. | 425/207 |

FOREIGN PATENT DOCUMENTS

| | | | |
|---|---|---|---|
| 1216171 | 5/1966 | Fed. Rep. of Germany | 425/192 |
| 2854650 | 6/1980 | Fed. Rep. of Germany | 425/376.1 |
| 7374127 | 8/1975 | France | 425/190 |
| 44-466 | 1/1969 | Japan | 425/192 |
| 61-283524 | 12/1986 | Japan | 425/190 |
| 445457 | 2/1968 | Switzerland . | |

*Primary Examiner*—Jay H. Woo
*Assistant Examiner*—James P. Mackey
*Attorney, Agent, or Firm*—Sprung, Horn, Kramer & Woods

[57] ABSTRACT

On a single-screw or multi-screw extruder, the part of the barrel lying between a front plate (1) and end plate (2) bounding the processing unit is subdivided into barrel discs (5) of ceramic materials, which are arranged on at least one guide rail (7). The barrel discs (5) are held together by an anchor (9) fixed on the front plate (1) and end plate (2) and at the same time secured against twisting. In addition, the screw elements (3) within the processing unit between front plate (1) and end plate (2) are also made from the same or from another ceramic material.

10 Claims, 2 Drawing Sheets

EXTRUDER WITH CERAMIC PROCESSING UNIT

BACKGROUND OF THE INVENTION

The invention is based on a single-screw or multi-screw extruder having one or more intermeshing screw shanks surrounded by a barrel. Extruders of all types are described in detail, for example, in the book by H. Herrmann, Schneckenmaschinen in der Verfahrenstechnik (Extruders in processing), published by Springer-Verlag, Berlin/Heidelberg/New York, 1972.

In conventional extruders of steel and related metallic materials, high-viscosity media with abrasive or corrosive or aggressive phases cannot be processed. Limits are also set to the use of metallic materials at very high temperatures.

Furthermore, an extruder is described in the Swiss Pat. No. CH 445 457, the barrel and screw shank fittings of which consist of individual narrow blades arranged perpendicular to the axis and adhesively fixed or soldered to one another. However, due to this type of connection, such extruders are not suitable for the above-mentioned processes and applications.

The material properties of ceramic materials make them of increasing interest for apparatus and mechanical engineering. For problems with abrasive media there are already various solutions in which machine parts are lined with ceramic or provided with a ceramic layer by a special application method. Due to the different coefficients of thermal expansion of the corresponding material combinations, problems frequently occur regarding the service life of the combined metal-ceramic part.

SUMMARY OF THE INVENTION

It was therefore the object to find, for the use of ceramic materials on an extruder, a design and process solution which is appropriate for the material or the material combinations.

Starting from an extruder having a barrel consisting of a plurality of discs disposed perpendicularly to the screw shanks, this object is achieved according to the invention in that the part of the barrel lying between a front plate and end plate bounding the processing unit is subdivided into barrel discs of ceramic materials, which are arranged on at least one guide rail and are secured against twisting by a continuous anchor fixed on the front plate and end plate and are thereby at the same time held together. In addition, the screw elements within the processing unit also consist of a ceramic material.

The transmission of the torque from the screw shank to the screw elements expediently takes place by way of the screw shank having a polygonal profile in cross-section which fits positively into a hub of the screw elements which is ground in conformity.

In the processing unit, the barrel advantageously consists of 5 to 50, preferably 10 to 30, barrel discs. The thickness of the barrel discs is expediently in the range from 20 mm to 500 mm, preferably 30 mm to 300 mm.

Aluminium oxide, zirconium oxide and, preferably, silicon nitrite or silicon carbide have proved successful as ceramic materials for the barrel discs.

With the extruder according to the invention, it is possible to carry out new, previously not possible chemical processes which include abrasive, corrosive or aggressive phases or the process temperatures of which are above the thermal strength values of metallic materials. A major advantage of this design solution is that the structural elements necessary for it can be produced without any problems with reasonable expenditure with the grinding and cutting-off machines available today. An important aspect is, furthermore, that conventional extruders can be modified and converted according to the invention.

An exemplary embodiment of the invention is explained in more detail below with reference to a drawing, in which:

DETAILED DESCRIPTION OF THE INVENTION

Figure 1:
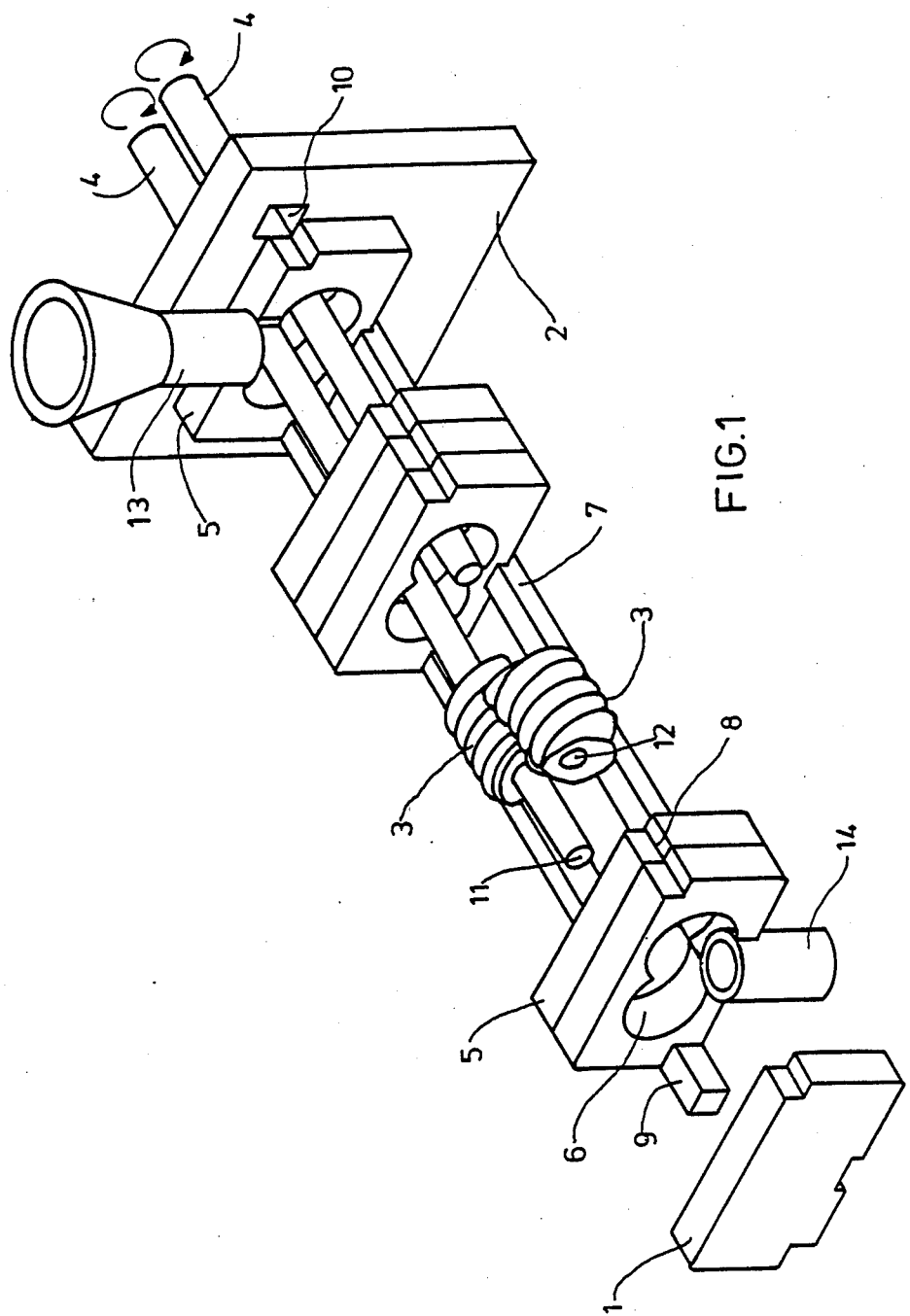
FIG. 1 shows the essential structural elements of the extruder in perspective representation and FIGS. 2a,b show the polygonal profile of screw shank and screw hub.

The processing unit of the extruder is bounded by a front plate 1 and an end plate 2. The front plate closes off the product or shank space. The screw elements 3 are held firmly on the shanks 4. In the processing unit between end plate 2 and front plate I, the screw barrel consists of a plurality of ceramic barrel discs 5, which are arranged one behind the other perpendicularly to the screw axis in the form of a pack. The number and the thickness of the discs is dimensioned such that they are packed closely one behind the other in the processing unit. The clearances 6, likewise one behind the other, in the discs 5 form the product or reaction space. The barrel discs 5 have, for example, a thickness of 30mm. For the part of the barrel in the processing section, for example, 20 such discs 5 are necessary. The discs consist of engineering ceramic.

Silicon nitrite or silicon carbide is preferably used. In addition, the barrel discs 5 are arranged on a guide rail 7 and are held together by the two diagonally opposite anchors 9 engaging in recesses 8 on the barrel discs 5. For this purpose, corresponding fits 10 are provided on front plate and end plate. The barrel discs 5 may, however, also be held together by means of separate axial threaded rods or by a yoke fitting over the discs 5. In the case of a specific embodiment, a hydraulic retaining device is also used for the discs 5. The anchors 9, in connection with the recesses 8, also prevent the barrel discs 5 being able to twist with respect to one another during operation of the extruder.

Figure 2A:
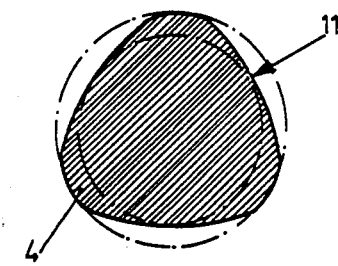
Figure 2B:
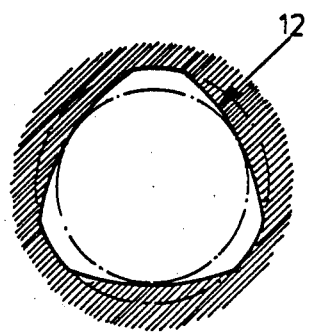

While on conventional metallic extruders the form closure between screw fittings and driving shank takes place via feather-key or multitooth connections, in the case of the ceramic processing unit according to the invention, special polygonal profiles have proved particularly successful for torque transmission. As can be seen in FIGS. 2a and 2b, such a polygonal profile 11 is produced by the sides d an equilateral triangle being replaced by arcs and the corners likewise being rounded off. The hub 12 of the screw elements must then be ground in conformity with the polygonal profile 11 of the screw shank (FIG. 2b), so that the screw elements 3, for example screw thread with various numbers of flights, various pitch, various rotational direction and special elements such as kneading discs, can be pushed positively onto the shanks 4.

During operation of the extruder, the polygonal profile transmits the torque from the shank to the screw elements 3.

At the beginning and end of the processing unit, the barrel discs 5 neighbouring the front plate 1 and end plate 2 are drilled out in such a way that a tube 13 for the product feed can be attached from above and at the other end a tube 14 for product removal can be attached from below. All other machine parts, for example mount, drive etc., are made in analogy with conventional extruders.

We claim:

1. An extruder comprising: at least one screw element mounted on a screw shaft for rotation around a longitudinal axis thereof; means forming a barrel with a reaction space therein for rotatably receiving the at least one screw element and screw shaft, wherein the means forming the barrel comprises a plurality of barrel plates, each composed entirely of ceramic material and having an aperture therein and means mounting the plates in an abutting relationship perpendicular to the longitudinal axis of the screw shaft and with the apertures aligned to define the reaction space.

2. The extruder according to claim 1, wherein the means mounting the barrel plates comprises end plates at ends of the barrel, at least one elongated guide rail having an angular cross section and extending the length of the barrel, at least one recess in each barrel plate and end plate configured to closely receive the guide rail to closely pack each barrel plate and end plate therealong, at least one elongated anchor having an angular cross section and extending the length of the barrel, and at least one recess in each barrel plate and end plate configured to closely receive the anchor, wherein the at least one guide rail and at least one anchor coact to prevent non-alignment of said apertures.

3. The extruder according to claim 2, wherein the means mounting the barrel plates comprises two anchors and one guide rail and wherein the anchors and guide rail have a rectangular cross section.

4. The extruder according to claim 1 or 2, wherein the at least one screw element is composed of ceramic material.

5. The extruder according to claim 1 or 2, wherein the barrel comprises 5 to 50 barrel plates.

6. The extruder according to claim 1 or 2, wherein the barrel comprises 10 to 30 barrel plates.

7. The extruder according to claim 1 or 2, wherein each barrel plate has a thickness of 20 to 500 mm.

8. The extruder according to claim 1 or 2, wherein each barrel plate has a thickness of 30 to 300 mm.

9. The extruder according to claim 1, wherein the screw shaft has a polygonal profile and the at least one screw element has a hub having a polygonal profile conforming to the polygonal profile of the shaft to closely receive the screw shaft.

10. The extruder according to claim 1, wherein the ceramic material is selected from the group consisting of aluminum oxide, zirconium oxide, silicon nitrite and silicon carbide.

* * * * *